United States Patent
Jibbe

(12) 
(10) Patent No.: US 6,367,033 B1
(45) Date of Patent: Apr. 2, 2002

(54) METHOD AND APPARATUS FOR RECREATING FIBER CHANNEL TRAFFIC

(75) Inventor: Mahmoud K. Jibbe, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/210,171

(22) Filed: Dec. 11, 1998

(51) Int. Cl.[7] ............................................. G06F 11/00
(52) U.S. Cl. ......................................................... 714/37
(58) Field of Search .............................. 714/33, 37, 39, 714/45

(56) References Cited

U.S. PATENT DOCUMENTS

| | | | |
|---|---|---|---|
| 5,247,517 A | 9/1993 | Ross et al. | 370/85.5 |
| 5,394,390 A | 2/1995 | Stauffer et al. | 370/17 |
| 5,446,874 A | 8/1995 | Waclawsky et al. | 395/575 |
| 5,457,694 A | 10/1995 | Smith | 371/20.1 |
| 5,539,659 A | 7/1996 | McKee et al. | 364/514 |
| 5,557,748 A | 9/1996 | Norris | 395/200.1 |
| 5,689,637 A * | 11/1997 | Johnson | 714/46 |
| 5,694,615 A | 12/1997 | Thapar et al. | 395/822 |
| 5,706,298 A * | 1/1998 | Sandorfi | 714/807 |
| 5,758,062 A * | 5/1998 | McMahon | 714/38 |
| 6,092,118 A * | 7/2000 | Tsang | 709/246 |
| 6,195,765 B1 * | 2/2001 | Kislanko | 714/38 |

OTHER PUBLICATIONS

The Microsoft Computer Dictionary, pp. 34,113,423,252, 253,264.*
ACM Computing Surveys vol. 26 No. 2 Jun. 1994 pp. 140–185.*

* cited by examiner

Primary Examiner—Robert Beausoleil
Assistant Examiner—Bryce P. Bonzo
(74) Attorney, Agent, or Firm—Carstens, Yee & Cahoon, L.L.P.

(57) ABSTRACT

A logic analyzer or a bus analyzer may be used to capture data from a source computer system to diagnose a problem arising in the source computer system. In many cases the problem can be traced to a particular hardware/software subsystem. Quite often, a customer of the manufacturer of the hardware/software subsystem maintains the source computer system. In the manufacturer's facilities is a reference system operated by a technician or engineer responsible to test and support the hardware/software subsystem. The source computer system and the reference system thus may involve different hardware and software configurations and possibly even different operating systems. The present invention provides a system and a method to allow data captured in a source computer system to be replayed in the remote reference system so as to recreate a captured event or analyze performance.

3 Claims, 5 Drawing Sheets

| Initiator ID 505 | Target ID 510 | Logical unit number 515 | Negotiate 520 | | CMD 525 | | | Data 530 | Status 535 | Statistics 540 |
|---|---|---|---|---|---|---|---|---|---|---|
| | | | IN 521 | Out 522 | OP 526 | L 527 | Add 528 | | | |

500

METHOD AND APPARATUS FOR RECREATING FIBER CHANNEL TRAFFIC

BACKGROUND OF THE INVENTION

1. Technical Field

This invention relates to the analysis of data transfer activity on systems such as data networks and data busses. More particularly, the invention relates to a system and a method to capture data transfer activity from a source computer system and recreate this activity on a reference system.

2. Description of the Related Art

A common problem faced by computer system developers involves the testing and debugging of hardware and software. In many cases a new hardware/software system such as a particular disk array and its associated drivers will be designed, manufactured, tested and sold. When the hardware/software system is fielded, certain customers will often report new problems not uncovered during prerelease testing. These new problems typically are uncovered because the customer's computer system configuration differs from the one used by the manufacturer to test the new hardware/software product. Ideally, the manufacturer would test a new product in all possible computer system configurations, but this is nearly impossible in most cases because the total number of possible system configurations in which the new hardware/software system may be placed is often unbounded.

Various forms of logic analyzers and bus analyzers are known in the art. These analyzers are used to test and analyze hardware/software systems such as disk arrays and systems such as computer boards which connect into a backplane chassis. Logic analyzers provide a plurality of test probes to collect digital data. One probe is connected to a clock input, another to a ground reference, and each other probe is connected to a test point to collect a bit of information each clock interval. Logic analyzers typically provide a menu driven user interface which allows collections of probes to be grouped into binary words and viewed, for example, as hexadecimal codes on a display monitor. Some logic analyzers also interpret and disassemble words captured from the bus and display associated mnemonics to make it easier for a technician or engineer to understand the captured data.

Known logic analyzers and related bus analyzers are able to capture data from a source computer system, format the data into a collection of logical data structures, collect statistical performance information related thereto, and present the data in various processed forms to a user. However, presently available systems assume a technician or engineer is available to both capture the information from the source computer system and analyze the data. The analysis of the captured information often involves trouble shooting to determine the source of an event such as an error condition or a slow down in performance. In many cases the end user has access to a source computer system which in which the event is observed. The end user is often not the same person as the technician or engineer assigned with supporting the product causing the event. Hence, a need arises to be able to duplicate the event in a reference system. The reference system is preferably a computer system maintained by the technician or engineer assigned with supporting the product.

In a computer hardware/software development environment, it is often very difficult to duplicate the environment associated with the source computer system located at a customer's site. This is because the source computer system and the reference system may have different numbers and types of host adapters, operating systems, disk drives, disk arrays, or other devices. Hence, while known logic analyzers and bus analyzers are well suited to diagnosing a problem located in a given system, they are not well suited to allow a remote technician to diagnose the problem. As a result, considerable time and effort is spent by product support engineering staffs in duplicating computer systems with diverse configurations which give rise to various problems encountered in different remote source computer systems maintained by customers.

Various types of sophisticated analyzers have been designed to enhance the functionality of a logic analyzer. For example, U.S. Pat. No. 5,457,694 describes a bus analyzer used for an advanced technology attachment (ATA) bus. The ATA bus is also known as an integrated device electronics (IDE) bus. The ATA bus analyzer disclosed therein performs tasks related to trouble shooting and performance measurement. This system captures data from an ATA bus much like a logic analyzer. A trigger may be used to control the starting and stopping of data capture. This analyzer uses a filter function to throw away large volumes of useless information which otherwise require storage space and obscure the trouble shooting process. Also, this analyzer formats data and provides a menu driven user interface. This user interface allows the user to search through a database of captured data to locate a particular event detected on the ATA bus. However, this system is useful only for trouble shooting a source computer system directly. This system does not provide a means for data to be captured from a given source computer system and then replayed in on a reference system to duplicate a run-time error.

In U.S. Pat. No. 5,446,874, a network analyzer is developed which is used to capture data transmitted on a network node. This system captures information, filters it to remove useless information, formats the data, and produces a statistical event vector relating to an observed traffic pattern. An expert system then views the statistical data as represented by the event vectors and determines when a network problem exists. This system allows performance to be analyzed. Again, this system is useful for only trouble shooting and analyzing performance on a given source computer system directly. This system does not provide a means for data to be captured from a given source computer system and then replayed in a reference system to duplicate a run-time error off-premises.

It would be desirable to have a process which could capture data from a source computer system and use this data to duplicate an event in a reference system. It would be desirable for this process to filter useless information from the captured data, and format the captured data according to higher-level template data structures representative of command and data transfers. It would be desirable to use this higher level representation to replicate command and data transfer transaction sequences observed within the source computer system. It would be desirable to be able to replay only selected portions of these sequences in the reference system so that only selected hardware in the reference system is made to participate in the replicated transaction sequences. It would further be desirable to use data captured and formatted by such a process to enable performance analysis of the source computer system. It would also be desirable to use the template data structures to provide information to a simulator which emulates system behavior for trouble shooting and performance analysis.

SUMMARY OF THE INVENTION

The present invention involves a method of processing captured data to allow events and error conditions observed on a source computer system to be reproduced on a reference system. A process of electronic system analysis according to the present invention includes the steps of converting a captured data file to a set of template data structures and playing back at least a subset of the template data structures to reproduce an event.

The present invention also provides a computer system as used to evaluate data collected from a source computer system as maintained by a customer. The computer system includes a host computer, a target device, a data transfer interconnect coupled between the host computer and the target device, and a software module. The software module is operative to play a sequence of data transactions as defined by information related to a data transfer sequence captured from a source computer system. The software module is also operative to record information returned by the target device. The target device is substantially identical to a source target device involved in at least some of the data transfers as captured from the source computer system.

Another aspect of the present invention provides a test apparatus which may be used to evaluate problems identified remotely. This test equipment includes a host adapter coupled to an interconnect. The test equipment also includes a control module coupled to the host adapter and operative to convert a template data structure into a physical layer data transfer. The physical layer data transfer takes place via the interconnect. The control module is also operative to record information related to a data transfer generated by a target device coupled to the interconnect. The template data structure is constructed to replicate a data transfer captured from a source computer system distinct from the apparatus.

Still another aspect of the present invention provides an electronically readable computer storage medium onto which is written a computer program. The computer program includes a data parser software module. This software module is coupled to receive an input stream representative of data captured from a source computer system. The data parser software module is also operative to produce a template data structure. The template data structure is representative of a data transaction at a selected protocol layer. The program also includes a data interpreter and organizer software module. This software module is coupled to receive the template data structure and to produce an output stream which includes one or more template data structures. This output stream is organized into an arrangement such as a particular file structure. The program also includes a host program software module coupled to receive information from the data interpreter and organizer software module. The host program module is coupled to control a host adapter. The host program is operative to recreate a data transfer related to the template data structure in a reference computer system other than the source computer system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a block diagram illustrating a template data structure produced in accordance with a preferred embodiment and of the present invention.

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
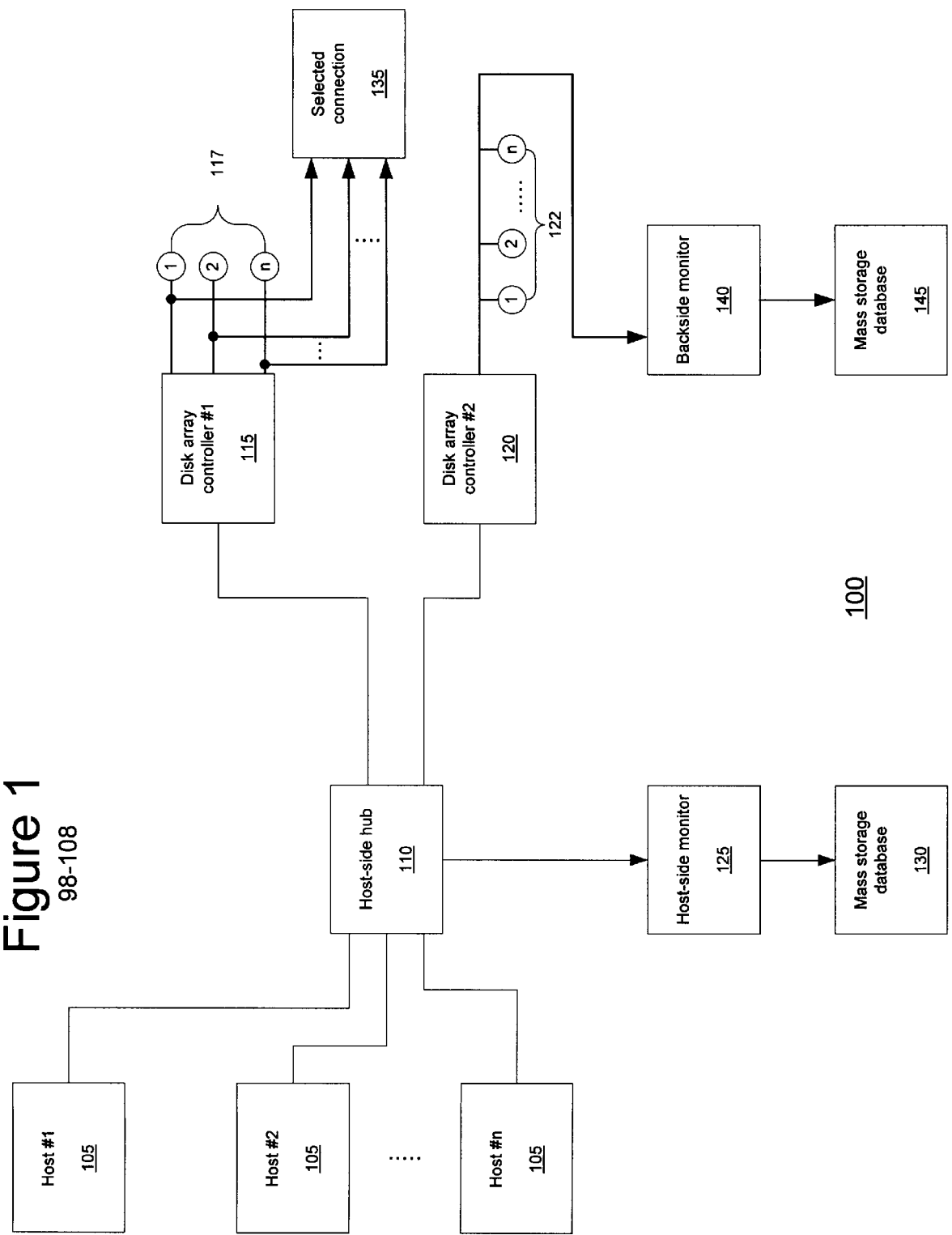
FIG. 1 is a high-level block diagram representing a source computer system from which data is captured.

FIG. 1 is a high-level block diagram of an illustrative embodiment of a computer system 100. System 100 includes one or more host computers 105, which are coupled to a host-side hub 110. The host-side hub is preferably a device such as a Fibre Channel hub or a Fibre Channel switching fabric. Host-side hub 110 is coupled to one or more peripheral units and/or storage units. For example, in the system 100, host-side hub 110 is coupled to a first disk array controller 115 and a second disk array controller 120. Host computers 105 may include one or more personal computers, workstations, servers, or any type of computer apparatus capable of executing application layer software. In the illustrative embodiment shown, disk array controller 115 and disk array controller 120 are preferably RAID (Redundant Array of Inexpensive Disk) disk controllers. In the illustrative embodiment, disk array controller 115 includes a set of parallel SCSI (Small Computer System Interface) connections to disks within a RAID disk array. Also, disk array controller 120 is connected to a set of disks in a disk array via a single high-speed serial connection as provided by an arbitrated optical fibre loop. It should be noted the present invention also may be applied in systems involving other types of mass storage units or peripherals beside disk arrays.

In the illustrative embodiment of system 100, host-side hub 110 is a device, which allows a host-side data transfer signal to be forwarded to multiple locations. For example host-side hub 110 may be implemented as a Fibre Channel hub and the host-side data transfer signal may be a signal compliant with a Fibre Channel physical or link layer protocol. Fibre Channel is a general name of an integrated set of standards developed by the American National Institute of Standards (ANSI) which defines protocols for flexible information transfer. As defined in the Fibre Channel Standard, data transfers may occur between devices connected into various topologies involving point to point connections, arbitrated loops, or switching fabrics. In other embodiments busses and protocols other than Fibre Channel may be used In an embodiment of computer system 100 involving a very simple type of host-side hub 110, a point-to-point connection exists between a single host computer 105 and a single disk array controller such as disk array controller 115. In this case host-side hub 110 may involve a tapped connection from a Fibre Channel point-to-point link. This tapped connection is used to send a copy of data transferred on the point-to-point link to a host-side monitor and analyzer 125. Host-side monitor and analyzer 125 is coupled to a mass storage database 130. In a Fibre Channel arbitrated loop topology, host-side hub 110 may involve a node capable of routing traffic to host-side monitor and analyzer 125. In other embodiments, host-side monitor and analyzer 125 may be connected as a node into the arbitrated loop itself in which case function of the host-side hub 110 is built into host-side monitor and analyzer 125. In Fibre Channel systems involving a switching fabric oriented topology, host-side hub 110 may involve a switching fabric used to route traffic between nodes and send a copy of selected traffic to host-side monitor and analyzer 125. In some systems, the functionality of host-side monitor and analyzer 125 may be built into one of host computer 105's host adapters and the mass storage database 130 may be implemented on a hard disk connected into the system 100. While the foregoing illustrative embodiment describes a preferred configuration built around the Fibre Channel Standard, the host-side data transfer mechanism may follow bus or network protocols other than Fibre Channel.

In embodiments involving any of the aforementioned topologies, host-side monitor and analyzer 125 may optionally be replaced by backside monitor and analyzer 140. Backside monitor and analyzer 140 is coupled to one or more disks as connected on the backside of disk array controllers 115 and 120. The backside involves signals sent between disk array controllers 115 and 120 and selected disks within the disk arrays 117 or 122. In systems involving multiple parallel backside connections such as disk array 117 which includes a plurality of parallel SCSI channels, a selector/concentrator 135 may be employed to select and route various signals to backside monitor and analyzer 140. Backside monitor and analyzer 140 is thus coupled to receive information from disk array 117 using selector/concentrator 135. In the illustrative embodiment of system 100, disk array 122 is preferably connected on the backside using a Fibre Channel arbitrated loop. Backside monitor and analyzer 140 is thus implemented with a Fibre Channel arbitrated loop interface to capture traffic sent across the loop.

In some embodiments, host-side monitor and analyzer 125 and the backside monitor and analyzer 140 may both be employed simultaneously. This type of embodiment captures information related to data transactions both between host computers 105 and disk array controllers 115 and 120 as well as information related to data transactions both between disk array controllers 115 and 120 and the disk arrays 117 and 122.

The illustrative embodiment of the system 100 shows a system based upon the Fibre Channel Protocol. As discussed herein below, the present invention may be applied to various types of computer systems involving other protocols as well. For example, the Host side hub 110 may be implemented in alternative embodiments using the ATA protocol, the SCSI protocol, the IEEE 1394 protocol, a TCP/IP protocol, or in general any data transfer protocol. The illustrative embodiment of system 100 is provided to show a specific representative computer system which may serve as a source computer system according to the present invention. In such systems, disk array controllers 115, 120 and disk arrays 117, 122 may be replaced with other types of computer peripheral devices or network nodes.

In operation, computer system 100 executes one or more host programs, which give rise to a first data traffic flow observable from host-side monitor and analyzer 125. This first traffic flow involves data transfers between host computers 105 and other devices such as disk array controllers 115 and 120. These data transfers take place over a host-side interconnect which may preferably be implemented using a Fibre Channel compliant means as discussed above. The execution of one or more host programs also gives rise to a second data traffic flow observable from backside monitor and analyzer 140. In the illustrative embodiment, this second data traffic flow takes place between disk array controllers 115, 120 and disk arrays 117 and 122. Selector/concentrator 135 is operative to select channels on which data is to be transferred from parallel disk array 117 to backside monitor and analyzer 140. If backside disk array is configured into an arbitrated loop, backside monitor and analyzer 140 is preferably connected into the arbitrated loop and is operative to record selected information therefrom. Other topologies such as topologies involving a backside switching fabric or hub may be similarly constructed to route specified information from the backside data channels to backside monitor and analyzer 140. As discussed earlier, one or both of host-side monitor and analyzer 125 and backside monitor and analyzer 140 may be employed in a specific embodiment of system 100.

As computer system 100 runs one or more host programs, host-side monitor and analyzer 125 and/or backside monitor and analyzer 140 are operative to monitor traffic flows and to capture data related to the observed traffic flows. The data captured from host-side monitor and analyzer 125 is saved to mass storage database 130. The data captured from backside monitor and analyzer 130 is saved to mass storage database 145. The mass storage databases may be implemented using various mass storage media such as a hard disk, a Zip™ disk, a writable optical disk, a magnetic tape, or a jointly shared hard disk, for example.

In accordance with an aspect of the present invention, computer system 100 is viewed as a "source computer system." A source computer system is a system from which data is captured for analysis purposes. Typically, the source computer system will be located at a customer site. In many cases, host-side monitor and analyzer 125 and backside monitor and analyzer 140 will involve test equipment such as a logic analyzer or a bus analyzer available at the customer's premises. In other cases a host adapter with built-in data capture capabilities may be available within the customer's system. Data captured from the customer's system is to be shipped back to a technical support facility such as the one maintained to support RAID disk arrays 117 and 122. In the technical support facility is maintained a reference system. The reference system has the same general structure as the computer system 100 but may differ in various ways. For example, the reference system and the source computer system may run different operating systems, use different types of host computers 105, etc. Some aspect of the source computer system and the reference system are the same however. That is, specific components of the source computer system such as first disk array controller 115 and first disk array 117 are also employed within the reference system. The reference system is typically a computer system maintained by a support staff of a manufacture and is used to test and analyze a particular subsystem such as the first disk array controller 115 and first disk array 117.

The present invention enables an event such as an error detected in source computer system 100 to be reproduced and analyzed in the reference system. For example, a customer may capture from source computer system 100 data leading up to an error condition. The customer then sends this captured data back to a technical support facility for analysis. Instead of the technical support facility attempting to recreate source computer system 100's configuration, the present invention enables the captured data to be used to recreate the problem within the reference system. This saves the technical support facility significant expense. The use of the data captured from computer system 100 to analyze a fault using a reference system is discussed in connection with FIGS. 2–5 herein below.

Figure 2:
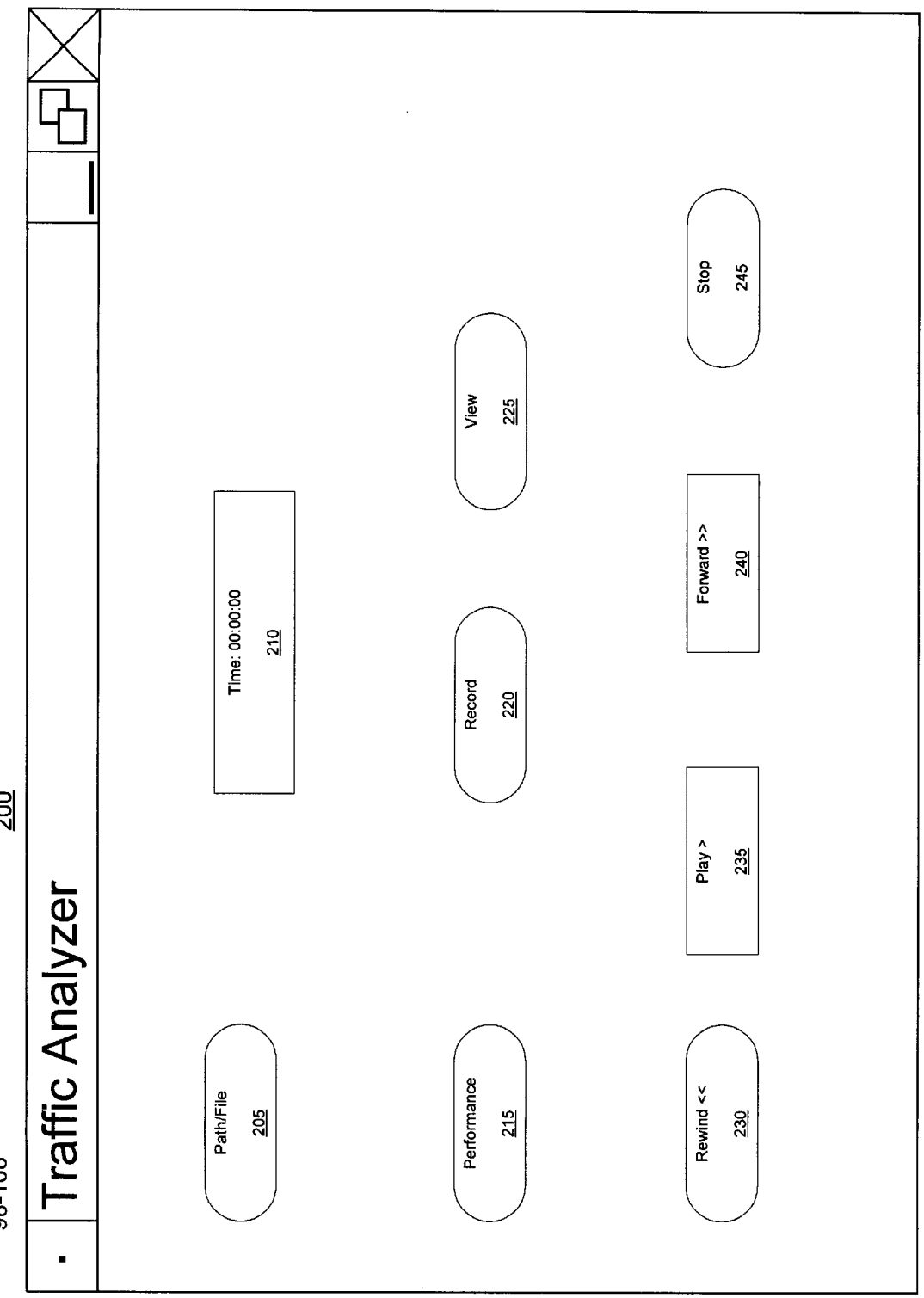
FIG. 2 is a diagram illustrating a user interface window provided to allow a user to control the system analyzer of the present invention.

FIG. 2 illustrates a GUI (graphical user interface) window 200 according to an embodiment of the present invention. This particular embodiment of a GUI window makes the system analyzer of the present invention appear to be similar to a traditional tape recorder or VCR (video cassette recorder). A path/file select button 205 is used to select a path and a file for use in data capture or analysis. When the path/file button is depressed, a dialog window preferably pops up into which a user enters a path and file specifier. When data is captured, data is written to the path/file specified by this button. When data is played back, data is extracted from the path/file specified by this button. A time button 210 is used to enter or read a time. Preferably the time 00:00:00 is representative of the beginning of a file or a specific event within a file. A performance button 215 is used to select a sub menu (not shown) which is used to cause performance analysis to be performed and performance data to be displayed. Time stamps and similar time related information are used to measure performance-related quantities such as the average number of data transfers per second, queue depths and the like. Simulations may also be performed based on captured data to assist in performance analysis. A record button 220 is used in a source computer system to cause data to be captured to the path/file specified by path/file button 205. A view button 225 is used to cause certain types of information relating to data transfer activity to be displayed. For example, view button 225 causes a display window with features of an advanced logic analyzer or bus analyzer to be displayed. In an analysis mode, a technician may view captured data in a variety of formats such as grouped hexidecimal digits, assembly level mnemonics, or decompiled high level language constructs used by a particular protocol.

A rewind button 230 is used to back up to a specified location in the data file designated by path/file button 205. Play button 235 is used to play out a sequence of events captured from a source computer system on a reference system. In some embodiments such as those used by support technicians to evaluate their own systems, the source computer system and the reference system are one in the same. In such environments data may be recorded from a single system using record button 220 and then played back on the same system using play button 235. A fast forward button 240 is similar to rewind button 230 and is used to advance a pointer in the data file as designated by path/file button 205. A stop button 245 is used to cause the analyzer to stop manipulating data. Additional buttons may be added to GUI window 200, for example to search through a captured data file for a specific event, or to specify a trigger event which when detected, will cause the recorder to start or stop capturing data.

In one mode of operation, GUI window 200 is operated to capture events which occur in a source computer system. The record button is selected to capture data as observed by host-side monitor 125 or backside monitor 145 into a file as specified by path/file button 205. In another mode of operation, the GUI window is used to analyze performance. The performance button is selected to allow captured data to be analyzed to provide information related to system throughput, system traffic levels, queue depths, and the like. In another mode of operation, GUI window 200 is used to play back events captured from the source computer system on the reference system. Play button 235 is used to cause one or more of host computers 105 to direct a sequence of data packets captured from source computer system 100 to be reproduced in the reference system. Typically the entire data transfer sequence is not played back, but only a portion of it is. For example, a data transfer sequence may be captured from source computer system 100 where the only transfers of interest are those between a specific one of hosts 105 and disk array controller 115. Then only the portion of the collected data generated by host 105 is played back on the reference system. In this example, identical copies of disk array controller 115 and disk array 117 are employed in both the reference system and source computer system 100. This way, when the data transfers, as initiated by host 105, are played back on the reference system, the event observed in source computer system 100 may be advantageously reproduced in the reference system. With the present invention as discussed in more detail below, this may occur even when the source computer system and the reference systems include different set of hardware subsystems, are configured differently, and run different operating systems.

In some cases it may be desirable to select both record button 220 and play button 235 simultaneously. This allows a captured data file to be played and a new file to be captured based on the data transactions recreated in the reference system. This allows the recreated event to be analyzed in non-real-time to compare the behavior of source computer system 100 with that of the reference system. Alternatively, view button 225 may be activated to open a window to observe activity of the reference system in real time.

Figure 3:
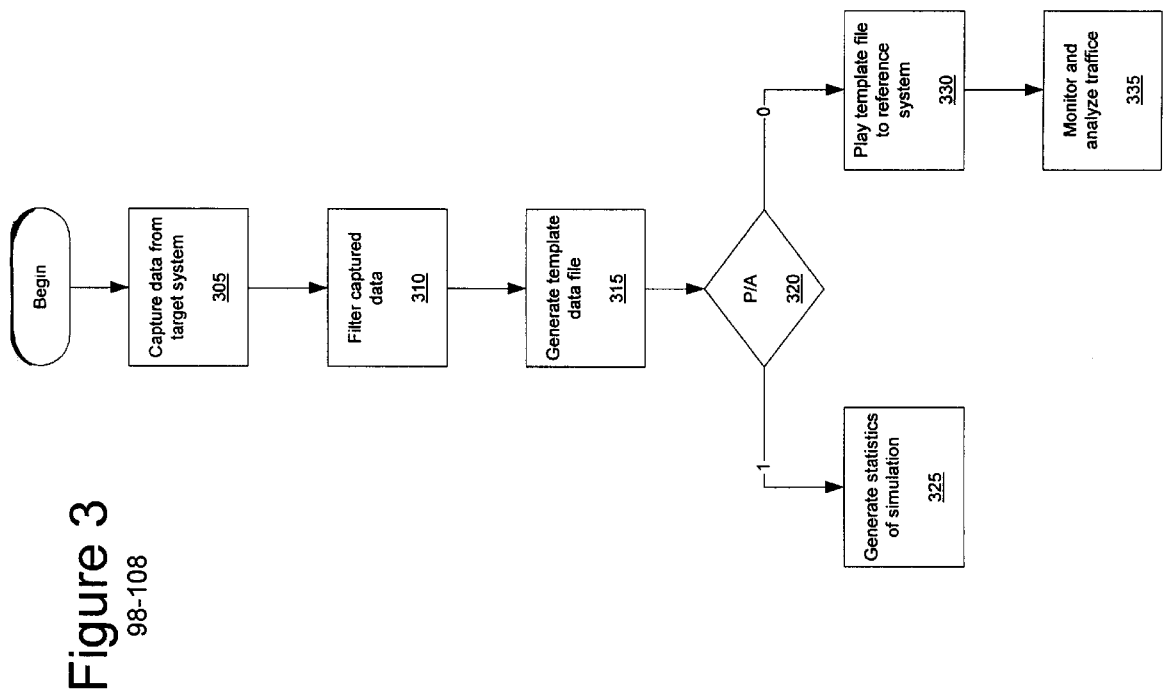
FIG. 3 is a flowchart illustrating a method of processing carried out in hardware and/or software and used to implement an system analyzer in accordance with a preferred embodiment of the present invention.

With reference now to FIG. 3, a flowchart of a process 300 for capturing and analyzing data is depicted in accordance with a preferred embodiment of the present invention. The process in FIG. 3 is preferably practiced by a software module whose user interface is presented in FIG. 2. Substantiations of this software module are preferably run on both the target and the reference system. The process in FIG. 3 involves both substantiations of the software module, but as discussed below, this process includes subprocesses, which are run only on the source computer system or the reference system. The process begins by capturing a set of data from source computer system 100 (step 305). Step 305 may be practiced by a logic analyzer, bus analyzer or network analyzer which simply captures data into a file. In these types of embodiments, the user of the source computer system is not equipped with a substantiation of the software module whose user interface is shown in FIG. 2. In other embodiments, step 305 is practiced using a substantiation of the software module whose user interface is depicted in FIG. 2. In this case the user selects record button 220 to initiate data capture.

The process next filters useless information from the captured data (step 310). Step 310 may be practiced by the program module substantiation in either the source computer system or the reference system. The process next generates an output which includes a set of template data structures (step 315). This output is preferably stored in a data file, but stream I/O may be used. Step 315 converts a raw bit stream as captured in step 305 into higher level representation embodied as template data structures. For example, the data captured from source computer system 100 may involve data frames and/or data packets at various layers of a communication protocol. Template data structures are developed to package data as data protocol units according to a designated protocol layer. Protocol layers are generically defined according to the OSI (open systems interconnect) model, and are specifically defined in a data transfer standard such as the SCSI standard, the Fibre Channel Standard, or various Internet standards. For example, depending on the embodiment, the template data structure may represent activity in data structures corresponding to any protocol layer from a physical layer to an application layer. Typically, the template data structures are constructed based on link or network layer protocol constructs. An example process of constructing the template data structures is discussed in further detail in connection with FIG. 4 below. An example data structure is discussed in connection with FIG. 5 below.

The flow of the process next proceeds to according to a decision which evaluates a state variable, P/A (step 320). The state variable P/A is set to one if a performance analysis mode is selected and is set to zero if an analysis mode is selected. The P/A variable is preferably set based on input provided to the user interface GUI window of FIG. 2. If the state variable P/A is set to one, the process next reads the template data structures generated in step 315 and performs a performance analysis (step 325). The performance analysis involves scanning through the captured data and analyzing information related to time stamps, queue depths, data transfer rates and the like to determine a measure of performance. The process may also use the template data structures to control a trace driven simulation. Statistical information relating to performance is preferably tabulated and presented to the user. In some cases the statistical data may be automatically used to tune simulation or system parameters to improve performance.

If the state variable P/A is set to zero, process is next operative to play the template data structure file back on the reference system (step 330). As mentioned above, a subset of the total set of template data structure data structures may be played out to emulate the behavior of a host computer, for example. A portion of source computer system 100 such as one including disk array controller 115 and disk array 117 is preferably reproduced in the reference system and is allowed to respond to the played-back packets as reproduced by a host adapter in the reference system. The process next monitors and analyzes data transfers generated in the references system (step 335). Step 335 may optionally automatically compare responses generated in the reference system to those produced in the source computer system. Systems with this feature may tabulate information relating to differences for presentation to a technician. Step 335 may also capture a data file from the reference system similarly to step 305, which captured data from the source computer system. In other embodiments, part or all of step 335 may be practiced with a fair amount of intervention from the technician using GUI window 200 and the submenus thereof.

In one embodiment of the method in FIG. 3, only the step of converting a captured data file to a set of template data structures (step 315) and the step of playing back at least a subset of the template data structures to reproduce an event (step 330) need be performed.

Figure 4:
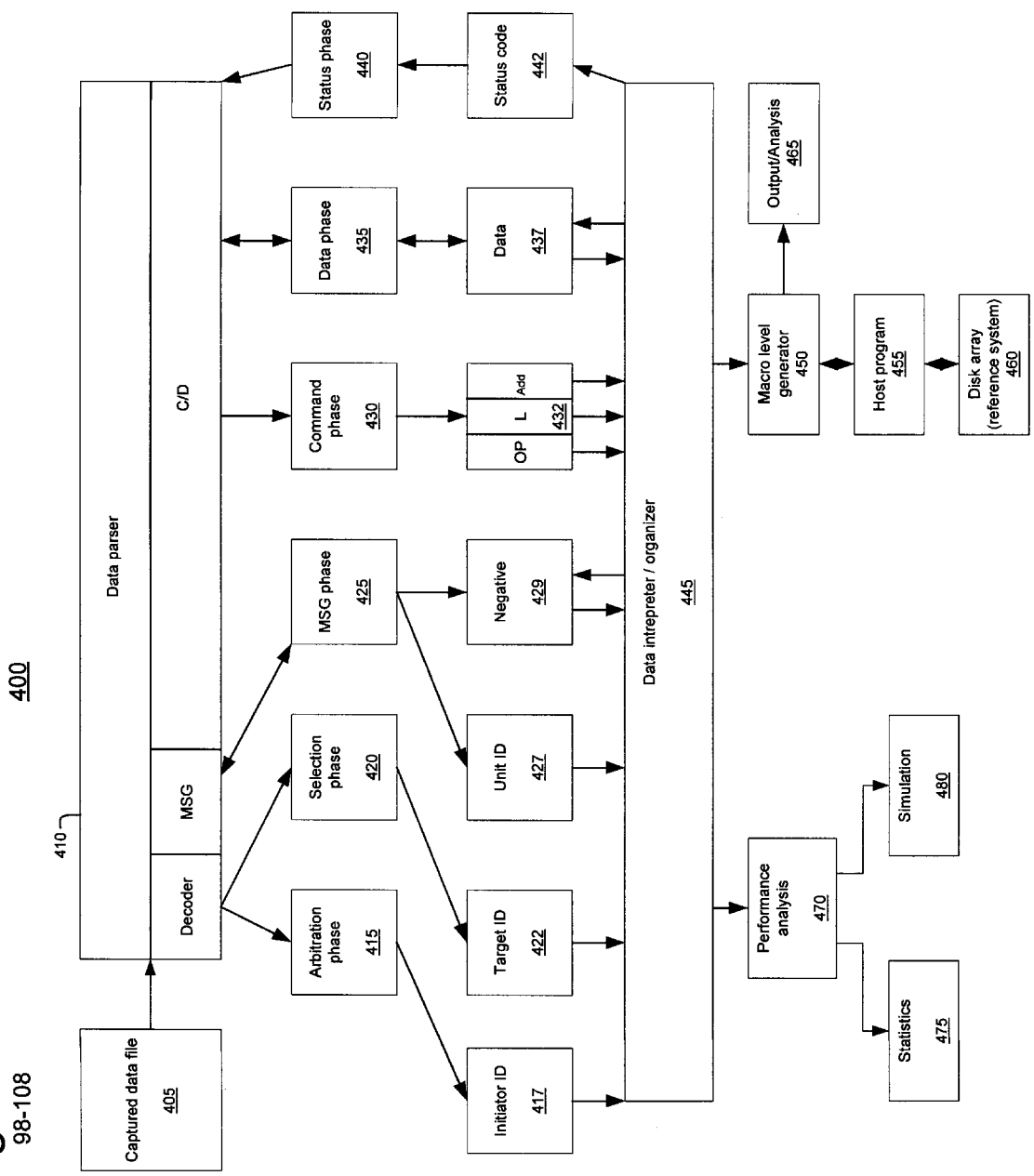
FIG. 4 is a block diagram illustrating a software system architecture associated with the system analyzer in accordance with a preferred embodiment and of the present invention.

With reference now to FIG. 4, an embodiment of a system 400 is illustrated. System 400 is illustrated using SCSI bus terminology, but the system architecture of the present invention may be used with any bus protocol such as Fibre Channel, PCI, and ATA. Likewise, system 400 of the present invention may be used to analyze data transmitted across any physical layer medium to analyze other types of data traffic such data traffic transmitted according to a network layer protocol such as IP (Internet Protocol). System 400 involves a software system, which preferably runs on a reference system with a structure involving all or part of the source computer system 100 as illustrated in FIG. 1. Recall source computer system 100 and the reference system may involve different hardware and software configurations but fall into the general class of systems whose architecture is discussed in connection with FIG. 1.

A captured data file 405 provides input to system 400. Captured data file 405 is preferably captured from source computer system 100. In many cases, captured data file 405 will be stored in a standard file structure as supported by operating systems such as Solaris™ of Sun Microsystems, Inc., or Windows98™ of Microsoft Inc. The captured data file may be stored on a Zip™ drive a magnetic tape, or transmitted across the Internet in order to transfer the data captured from source computer system 100 to the reference system. System 400 is preferably embodied within the reference system, although in some embodiments, data parsing as discussed below may be performed by a data capture software module (using record button 220) run on source computer system 100. This type of embodiment seeks to minimize the size of data file 405 so less data needs to be transferred from source computer system 100 to the reference system.

Captured data file 405 is input into a data parser 410, which is operative to convert a set of data from a physical layer interface into a link layer (or higher layer) data structure called a "template data structure." A template data structure is a data structure which contains information relating to data transfers as organized according to frames, packets, or any convenient construct based on the data transfer protocol used at a given protocol layer of interest. In the illustrative embodiment of FIG. 4, data parser 410 is illustrated as one which parses data transfers which occur as a sequence of bus phases. Most bus protocols involve a set of bus phases similar to those illustrated herein. The bus phases illustrated herein are SCST bus protocol, but other bus protocols such as those used by Fibre Channel compliant systems use similar phases. Different protocols tend to be similar in many ways and different in others. Also, most bus protocols use slightly different terminology to describe similar concepts. It is to be understood the data parser of the present invention may be constructed to parse bus signals into template data structures based upon whatever protocol is used in the data stored in captured data file 405. The illustrative embodiment shown in FIG. 4 is provided as a specific example of a preferred embodiment of the present invention.

Data parser 410 involves a decoder portion, which is operative log information related to bus arbitration signals associated with a given data transfer into the template. The bus arbitration signals associated with a given data transfer are generated during an arbitration phase 415. Data parser 410 detects bus arbitration signals and logs into the template data structure an initiator ID (identifier) 417 associated with a host adapter which corresponds to one of the hosts 105. The initiator ID identifies the host which wins the arbitration and is thereby associated with the data transfer to follow. The decoder portion of the data parser is also operative to log information related to a selection phase 420 which follows the arbitration phase. In selection phase 420, a target ID 422 is extracted and logged into the template data structure. Target ID 422 identifies the target device with which the host adapter wishes to communicate. For example, the target device may correspond to disk array controller 115. A "source target device" is defined as a target device in source computer system 100. As discussed below, a target device in the reference system is used to replicate the actions of the source target device in the reference system.

Next a message portion of the data parser is operative to log information related to a message phase 425 where a logical unit ID 427 is provided and a link layer data transfer protocol is negotiated. The message portion of the data parser logs the logical unit ID (also known as a LUN) into the template. The LUN designates a logical partition such as one constructed as a collection of sectors taken from each of the disks one through n in disk array 117. The message portion of the data parser is also operative to log information related to a link layer protocol negotiation 429 into the template. Unlike the previous information logged into the template, link layer protocol negotiation 429 involves a bi-directional data transfer whereby the host adapter associated with initiator ID 417 exchanges data with the target device associated with target ID 422.

In accordance with an embodiment the present invention, the data template data structure stores information related to the negotiation in both the outgoing direction from initiator to target and in the incoming direction from the target back to the initiator. As discussed below, when the data template data structure is used to recreate an event on the reference system, only the outgoing information will be generated from a host adapter. The incoming information will be allowed to come from a local device in the reference system such as a replication of disk array controller 115 and disk array 117. In some embodiments the incoming information from the target back to the initiator need not be stored in the template data structure since this information need not be replayed in the reference system. However, in most preferred embodiments this information is stored in the template data structure in order to be available for later comparison to results obtained in the reference system.

After message phase 425 is command phase 430. In the command phase, an opcode, a length and an address (Op, L, ADD) 432 are used to set up a particular type of data transfer. For example, the opcode, Op, may indicate the data transfer type is a read (data transfer from target to initiator), the length, L, may indicate the 1024 bits are to be transferred, and the address, ADD, may indicate an address specified as a hexidecimal number. A C/D (command/data) portion of the data parser is operative to log information related to the command phase into the template.

After command phase 430 is data phase 435. In data phase 435, a payload of data is transferred either from the initiator to the target (write) or from the target to the initiator (read). The C/D portion of the data parser is also operative to log information related to data payload into the template data structure. As discussed below, during play-back, information read from a target is not played back, but may be used in some cases to automatically compare the results obtained in the reference system to those observed in source computer system 100.

After data phase 435 is status phase 440. In status phase 440, status information, for example relating to the result of an error detection, is returned back from the target to the initiator. The C/D portion of the data parser is also operative to log information related to returned status information into the template data structure. As discussed below, during playback status information is not played back from the host adapter, but may be used in some cases to compare status results in the reference system to those observed in the source computer system 100.

Any or all of the aforementioned information fields (417, 422, 427, 429, 432, 437, 442) related to the template data structure are presented to a data interpreter/organizer 445. Data interpreter/organizer 445 receives template data structure information related to data transfers associated with an entire segment of a data-capture recording. Data interpreter/organizer 445 preferably filters useless information from the set of template data structures. For example, in some cases only data transfers involving a particular target ID may be of interest. If this is the case, all of the template data structures not involving this target ID may be discarded. The data interpreter/organizer may also associate time stamp information with each stored template data structure or provide other services to organize the template data structure data structures for use in playback and performance analysis. In most embodiments, data interpreter/organizer 445 outputs a stream which is placed into an output file or piped to another module such as a macro-level generator 450 or a performance analysis module 470. In cases where data interpreter/organizer 445 produces an output file, this output file will typically be used as input to macro-level generator 450 or performance analysis module 470.

In some systems, data interpreter/organizer 445 may alter data contained within a given template. For example, in source computer system 100 the target ID of disk array controller 115 has a first value, while in the reference system, an identical disk array controller has a different target ID. In such a case, the data interpreter/organizer is operative to translate the first target ID as used in source computer system 100 to the second target ID as used in the reference system. In general, data organizer 445 is operative to scan through the data produced by data parser 410 and format it to be executed on the reference system and/or analyzed.

Macro-level generator 450 receives as its input a data file including an organized and filtered set of template data structures. The macro-level generator then produces a command sequence which is sent to a host program 455. The command sequence generated by macro-level generator 450 defines a set of commands to be played back by host program 455 to recreate data transfers similar to those captured in the source computer system. Host program 455 plays the command sequence in the reference system across an associated host adapter coupled to a bus in the reference system. The host adapter in the reference system acts as the initiator to recreate in the reference system the set of data transfers observed in the source computer system. The target device is typically some subsystem such as a disk array 460, which replicates, for example, disk array controller 115 and disk array 117 in source computer system 100. Data received from disk array 460 by the host adapter associated with host program 455 is preferably passed back to the macro-level generator 450 for comparison and analysis. The macro-level generator 450 may simply store all of the information related to the recreated data transfer sequence into a raw data file, or may parse the data returned by reference disk array 460 into a set of template data structure data structures. Macro-level generator may also compare template data structure data structures as obtained in the reference system to template data structure data structures obtained in the source computer system and note differences therebetween. Also, macro-level generator 450 may be configured to play back data through the reference system, monitor responses from reference disk array 460, and produce an indication signal when a particular event is detected such as an error condition under study.

The output file produced by data interpreter and organizer 445 may also be directed to performance analysis module 470. Performance analysis module 470 preferably includes a statistics generation module 475. For example, statistics generation module 475 is operative to process time stamp information to generate statistics related to the number and size of reads and writes per second. Statistics relating to buffer queue depths, buffer queue overflows, the frequency of data resends and error conditions, and the like may also be tabulated. Performance analysis module 470 also preferably includes a simulation module 480. The simulation module is operative to generate a trace driven simulation in order to analyze system performance under various simulated conditions.

The foregoing discussion enables a reference computer system, which may be used to evaluate data collected from a source computer system as maintained by a customer. The reference system includes a host computer similar to host computers 105, a target device, similar to disk array controller 115, and disk array 117, a data transfer interconnect coupled between the host computer and the target device such as a Fibre Channel arbitrated loop, and a software module. The reference computer system may also include a host-side hub 110 implemented for example as a Fibre Channel hub or switching fabric. The software module is operative to play a sequence of data transactions as defined by information related to a data transfer sequence captured from a source computer system. The software module is also operative to record information returned by the target device. The target device is substantially identical to a target device involved in at least some of the data transfers as captured from the source computer system.

The foregoing discussion also enables a test apparatus, which may be used to evaluate problems identified remotely. This test apparatus includes a host adapter coupled to an interconnect. The test equipment also includes a control module coupled to the host adapter and operative to convert a template data structure into a physical layer data transfer. The physical layer data transfer takes place via the interconnect. The control module is also operative to record information related to a data transfer generated by a target device coupled to the interconnect. The template data structure is constructed to replicate a data transfer captured from a source computer system distinct from the apparatus. In other words, the test apparatus according to the present invention has a structure similar to the aforementioned reference system, but may be used to connect directly to a device under test such as disk array controller 115 and disk array 117. The test apparatus may include host-side hub 110, or may be connectable thereto.

The foregoing discussion also enables an electronically readable computer storage medium onto which is written a computer program. The computer program includes a data parser software module. This software module is coupled to receive an input stream representative of data captured from a source computer system. The data parser software module is also operative to produce a template data structure. The template data structure is representative of a data transaction at a selected protocol layer. The program also includes a data interpreter and organizer software module. This software module is coupled to receive the template data structure and to produce an output stream, which includes one or more template data structures. This output stream is organized into an arrangement such as a particular file structure. The program also includes a host program software module coupled to receive information from the data interpreter and organizer software module. The host program software module is coupled to control a host adapter. The host program is operative to recreate a data transfer related to the template data structure in a reference computer system other than the source computer system.

With reference now to FIG. 5, an example of a template data structure 500 is illustrated. In this example, the template data structure 500 tabulates information extracted from the data parser 410 as discussed in connection with FIG. 4. A first field 505 stores the initiator ID as extracted by data parser 410 in extraction 417. A second field 510 stores the target ID as extracted by data parser 410 in extraction 422. A third field 515 stores the logical unit ID (LUN) as extracted by data parser 410 in extraction 427. A fourth field 520 stores input and output negotiation information respectively in a subfield 521 and a subfield 522. These subfields hold the information extracted by data parser 410 in extraction 429. A fifth field 525 stores opcode, transfer length, and address information respectively in a subfield 526 a subfield 527 and a subfield 528. These subfields hold the information extracted by data parser 410 in extraction 432. A sixth field 530 stores the data payload as extracted by data parser 410 in extraction 437. A seventh field 535 stores the returned status information as extracted by data parser 410 in extraction 442. An eighth field 540 stores the statistical information such as a time-stamp which may be associated with a given data transfer. Other information including pointers to a next template data structure or other auxiliary information may be added to the template data structure. The template data structure may be defined in various ways depending on the programming language used to implement the processes of the present invention.

Although the present invention has been described with reference to specific embodiments, other embodiments may occur to those skilled in the art without deviating from the intended scope. For example, various data transfer protocols may be used which give rise to different types of bus phases and different types of information which need to be stored in a template data structure. Therefore, it is to be understood that the invention herein encompasses all such embodiments which do not depart from the spirit and scope of the invention as defined in the appended claims.

What is claimed is:

1. A computer system comprising:

a host computer;

a target device;

a data transfer interconnect coupled between the host computer and the target device; and a software module operative to play a sequence of data transactions as defined by information related to a data transfer sequence captured from a source computer system, wherein the software module is also operative to record information returned by the target device, the target device being substantially identical to a source target device involved in at least some of the data transfers as captured from the source computer system.

2. Test apparatus comprising:

a host adapter coupled to an interconnect; and a control module coupled to the host adapter and operative to convert a template data structure into a physical layer data transfer which takes place via the interconnect, the control module further being operative to record information related to a data transfer generated by a target device coupled to the interconnect;

wherein the template data structure is constructed to replicate a data transfer captured from a source computer system distinct from the apparatus.

3. A computer program product in a computer-readable medium for electronic system analysis, comprising:

a data parser software module coupled to receive an input stream representative of data captured from a source computer system, the data parser software module further being operative to produce a template data structure representative of a data transaction at a selected protocol layer;

a data interpreter and organizer software module coupled to receive the template data structure and to produce an output stream comprising one or more template data structures organized into an arrangement; and a host program software module coupled to receive information from the data interpreter and organizer software module and coupled to control a host adapter, the host program being operative to recreate a data transfer related to the template data structure in a reference computer system other than the source computer system.

* * * * *